United States Patent [19]

Noyama et al.

[11] Patent Number: 5,288,446
[45] Date of Patent: Feb. 22, 1994

[54] PRODUCTION OF RUBBER ARTICLE

[75] Inventors: Tomoko Noyama, Takarazuka; Akihiro Nakahara, Ibaragi, both of Japan

[73] Assignee: Sumitomo Rubber Industries, Ltd., Kobe, Japan

[21] Appl. No.: 943,546

[22] Filed: Sep. 11, 1992

Related U.S. Application Data

[63] Continuation of Ser. No. 689,506, Apr. 23, 1991, abandoned.

[30] Foreign Application Priority Data

| Apr. 23, 1990 | [JP] | Japan | 2-043226[U] |
| Apr. 23, 1990 | [JP] | Japan | 2-106713 |
| Apr. 23, 1990 | [JP] | Japan | 2-106715 |

[51] Int. Cl.$^5$ ............................................. B29C 35/02
[52] U.S. Cl. .................................. 264/108; 264/175; 264/211; 264/328.2; 264/328.18; 264/331.13; 524/399; 524/400; 524/430; 524/571
[58] Field of Search ............... 264/108, 175, 211, 325, 264/326, 328.2, 328.3, 328.18, 331.13; 524/399, 400, 430, 571

[56] References Cited

U.S. PATENT DOCUMENTS

| 3,513,067 | 5/1970 | Tangorra | 264/108 |
| 3,928,525 | 12/1975 | Fuwa et al. | 264/211 X |
| 4,266,772 | 5/1981 | Martin et al. | 273/218 |
| 4,529,770 | 7/1985 | Hayes et al. | 524/445 |
| 4,983,678 | 1/1991 | Saito et al. | 525/193 |

FOREIGN PATENT DOCUMENTS

| 0139044 | 5/1985 | European Pat. Off. |  |
| 2343385 | 3/1974 | Fed. Rep. of Germany . |  |
| 3333531 | 3/1985 | Fed. Rep. of Germany | 264/108 |
| 3918929 | 12/1989 | Fed. Rep. of Germany . |  |

*Primary Examiner*—Leo B. Tentoni
*Attorney, Agent, or Firm*—Birch, Stewart, Kolasch & Birch

[57] ABSTRACT

The present invention provides a novel process which imparts anisotropy strength to a rubber article. The process of the present invention includes mixing a rubber composition under a shearing force in a certain direction and then vulcanizing it in a mold, wherein said rubber composition comprises a base rubber, 3 to 100 parts by weight of a metal salt of an alpha, beta-unsaturated fatty acid, and 0.5 to 5.0 parts by weight of an organic peroxide; parts by weight being based on 100 parts by weight of base rubber.

11 Claims, 1 Drawing Sheet

FIG. I
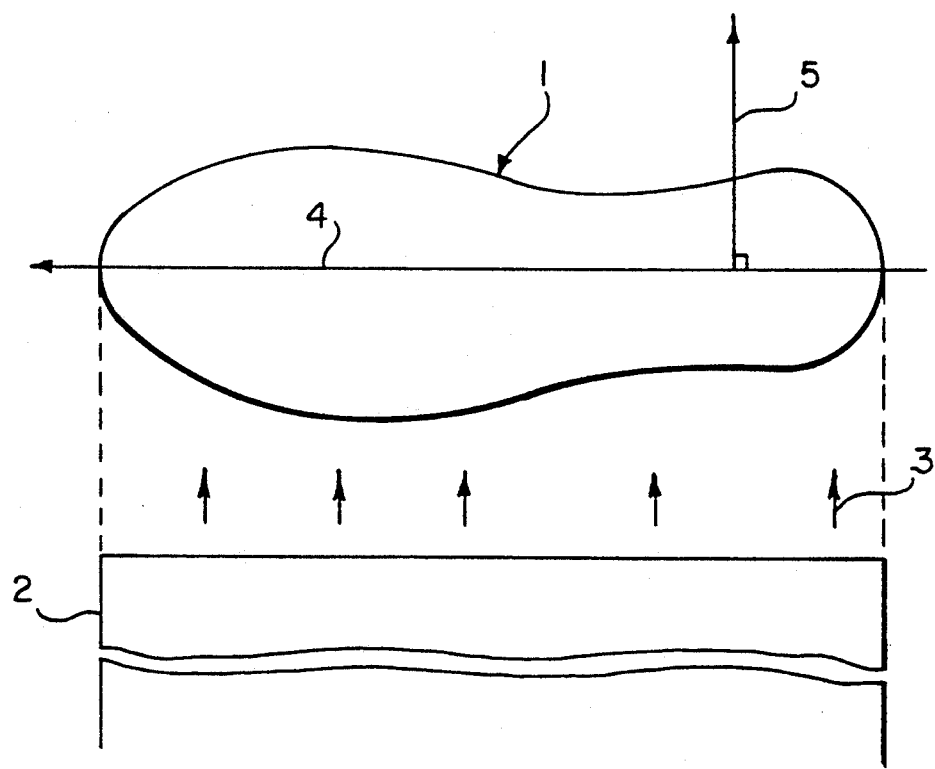

PRODUCTION OF RUBBER ARTICLE

This application is a continuation of application Ser. No. 07/689,506 filed on Apr. 23, 1991, now abandoned.

FIELD OF THE INVENTION

The present invention relates to a process for preparing a rubber article which has anisotropy strength. More particularly, the present invention relates to a process for preparing a rubber article which has a high strength in a certain direction and does not have such a high strength in the other directions, and a rubber article prepared therefrom.

BACKGROUND OF THE INVENTION

A rubber material which has rubber resilience and anisotropy of strength has been recently desired elements for such as sports equipment hoses and the like.

In order to impart anisotropy strength to a rubber article, it is known that fibers (e.g. short fibers) or fillers (e.g. silica and mica) are mixed with the rubber composition under a shearing force and oriented in a certain direction. In this process, however, since the fibers have poor miscibility with rubber, it takes long time to disperse the fibers in the rubber composition. Thus the rubber composition thus obtained often gives rise to problems in dispersibility and retention of fiber form (e.g. breaking or bending of the fibers). If the fillers are formulated for anisotropy strength, a large amount of the fillers must be formulated into the rubber composition in order to impart thereto sufficient orientation. This large amount of fillers adversely affects the physical properties (e.g. tensile strength, wear resistance and compression set) of the resulting rubber.

SUMMARY OF THE INVENTION

The present invention provides a process which imparts anisotropy strength to a rubber article without the above mentioned problems. The process of the present invention comprises mixing a rubber composition under shearing force in a certain direction and then vulcanizing it in a mold, wherein said rubber composition comprises a base rubber, 3 to 100 parts by weight of a metal salt of an alpha, beta-unsaturated fatty acid, and 0.5 to 5.0 parts by weight of an organic peroxide; said parts by weight being based on 100 parts by weight of the base rubber.

The present invention also provides a rubber article obtained by the above mentioned process.

The present invention further provides its application to a rubber article.

BRIEF EXPLANATION OF THE DRAWING

FIGURE 1 is a drawing which shows the direction in which the orientation direction of the rubber composition of the present invention is adjusted.

DETAILED DESCRIPTION OF THE INVENTION

The base rubber employed in the present invention is not limited, and thus includes butadiene rubber, styrene-butadiene rubber, EPDM, isoperene rubber, chloroprene rubber, natural rubber, a mixture thereof and the like. Preferred is cis-1,4-polybutadiene rubber which has a cis-structure of 90% or more.

The metal salt of an alpha, beta-unsaturated fatty acid employed in the present invention preferably is a metal salt of an unsaturated acid having 3 to 8 carbon atoms. Examples of the unsaturated acid having 3 to 8 carbon atoms are acrylic acid, methacrylic acid, itaconic acid, crotonic acid and the like. The metal for forming the metal salt includes a divalent metal, such as zinc, magnesium and calcium; a monovalent metal, such as sodium and lithium; and other metals, such as aluminum. The alpha, beta-unsaturated fatty acid is present in the rubber composition in an amount of 3 to 100 parts by weight, preferably 10 to 70 parts by weight, based on 100 parts by weight of the base rubber. An amount of less than 3 parts by weight does not impart anisotropy strength and that of more than 100 parts by weight possesses poor workability because of hardness of the composition.

The organic peroxide employed in the present invention is not limited, for example perbenzoic acid, benzoyl peroxide, cumen peroxide, dicumyl peroxide and like. The organic peroxide is present in the rubber composition in an amount of 0.5 to 5.0 parts by weight, preferably 1.0 to 3.0, based on 100 parts by weight of the base rubber. Amounts of more than 5.0 parts by weight increase fragility.

It is known that the metal salt of alpha, beta-unsaturated acid is co-crosslinked with rubber backbones to impart hardness and durability to the cured rubber. It, however, has been surprisingly found by the present inventors that the crystals of the metal salt of alpha, beta-unsaturated acid are oriented along the direction of the rubber molecules in the rubber composition when mechanically mixed. This fact is determined by an by X ray diffraction meter. The present inventors also have found that, when the rubber composition containing the metal salt of alpha, beta-unsaturated acid is mixed under shearing force in a certain direction and then vulcanized without destroying the crystal orientation, the resulting rubber article is very strong in the orientation direction and is not so strong in the other directions, especially in the direction perpendicular to the orientation direction. It is further found that the rubber article of the present invention has anisotropy of elongation similar to the anisotropy of strength. Thus the rubber article has a high elongation in the rubber orientation direction, but not so high in the other directions.

The rubber composition may contain a reinforcing agent and additives, if necessary. If the reinforcing agent, especially short fiber, is added to the rubber composition, the obtained rubber article has even superior physical properties. For examples, the short fiber can enthusiastically enhance the anisotropy strength in the rubber article. The short fiber includes art-known synthetic fiber, such as carbon fiber, alumina fiber, polyamide fiber, carbonized silicon fiber, silica fiber, boron fiber, potassium titanate fiber, polyester fiber, polyvinyl alcohol fiber, polyacryl fiber, polyacrylonitrile fiber, polyvinyl chloride fiber, polyvinylidene fiber, polyethylene fiber, polypropylene fiber, polyurea fiber and the like; and natural fiber, such as hemp fiber and the like. The fibers may be pretreated to strengthen them or to increase adhesive ability with the rubber. The preferred fiber is polyacrylonitrile fiber or polyamide fiber, especially nylon fiber. The short fiber preferably has a length of 1 micrometer or more, more preferably 30 mm or less and a diameter of 10 $\mu$m denier or more. For nylon fiber, 5 denier or more is preferred. The most preferred fiber has a length of 1 mm or more and a diameter of 10 μm or more. The short fiber may be present in the rubber composition in an amount of 3 to 100 parts by weight, preferably 10 to 50 parts by weight, based on 100 parts by weight of the base rubber. An amount of less than 3 parts by weight does not exhibit the effect of the addition of the fiber whereas more than 100 parts by weight may give rise to problems in moldability.

The method of mixing under a shearing force in a certain direction may be conducted by a roll, an extruder, an injection molder and the like. The orientation direction is equal to the circumferential direction of the roll and to the extrusion direction in the extruder. It is also equal to the injection direction in the injection molder.

The rubber composition is then vulcanized under conventional conditions, for example at 140° to 170 ° C. for 10 to 40 minutes in a mold. The physical properties of the rubber article may be changed by laminating rubber sheets together such that the orientation directions are uniform or cross each other and then vulcanizing the resulting composite.

It is preferred that the rubber composition is formed into a rubber hose by winding it on a mandrel such that the rubber orientation direction is adjusted to the circumferential direction of the mandrel. The resulting rubber hoses have a high strength in their circumferential directions but are soft for bending. The rubber article of the present invention may also be a timing belt, a chain, a rubber spring and the like. It is also preferred that the rubber articles of the present invention are rubber soles for shoes. Especially, as shown in FIG. 1, the rubber sole 1 of the present invention preferably aligns the rubber orientation direction 3 along a direction 5 perpendicular to the waking direction 4. The rubber sole 1 of the present invention has properties that it is easily bent in the walking direction and is not bent very much in the direction perpendicular to the walking direction, which therefore is very suitable for rubber soles of sports shoes. The rubber sole, of course, has the other necessary properties, such as durability, wear resistance and cushioning characteristics.

The present invention can provide a rubber article by a process which has never been considered in peoples in rubber field. The process of the present invention may reduce producing cost and provide the rubber article which has excellent physical properties.

EXAMPLES

The present invention will be illustrated by the following Examples which, however, are not to be construed as limiting the present invention to their details.

EXAMPLE 1

A rubber composition was prepared by mixing 80 parts by weight of butadiene rubber, 20 parts by weight of natural rubber, 65 parts by weight of basic zinc methacrylate, 0.7 parts by weight of an antioxidant and 1.0 part by weight of dicumyl peroxide using a roll under shear force to the circumferential direction of the roll. The resulting rubber composition was wound around a mandrel of an inner diameter of 5 mm and then put in a cylindrical mold having an outside diameter of 18 mm, followed by vulcanizing at 160 ° C. for 30 minutes. When the rubber composition was wound around the mandrel, one was wound such that the rubber orientation direction was adjusted to the circumferential direction of the mandrel, which is called "circumferential" and the other was done such that the rubber orientation direction was adjusted to the longitudinal direction of the mandrel, which is call "longitudinal".

Each obtained rubber pipe was supported by two supports at 70 mm distance interval and a maximum stress was determined by putting down a portion between the supports. A rate for putting down was 10 mm/minute. The results are shown in Table 1.

TABLE 1

|  | Maximum bending stress (Kgf) |
| --- | --- |
| Circumferential | 16.4 |
| Longitudinal | 29.2 |

The above obtained rubber composition was formed to sheet under the same vulcanizing conditions and then was drawn to the rubber orientation direction or to a direction perpendicular thereto to determine tensile strength, tear strength and elongation. The results are shown in Table 2.

TABLE 2

|  | Tensile strength (Kg/cm$^2$) | Tear strength (Kg/cm) | Elongation (%) |
| --- | --- | --- | --- |
| Rubber orientation | 175.9 | 67.6 | 297 |
| Perpendicular | 151.3 | 65.4 | 468 |

Subsequently, the sheets were employed and their coefficients of linear expansion both to the rubber orientation direction and a direction perpendicular thereto were determined by an apparatus called SN #230 available from Rigaku Electric Company. The results are shown in Table 3.

TABLE 3

|  | Coefficient of linear expansion |
| --- | --- |
| Orientation | $1.3 \times 10^{-4}$/°C. |
| Perpendicular | $3.2 \times 10^{-4}$/°C. |

The above results show that the rubber article of the present invention has anisotropy of strength.

EXAMPLES 2 TO 5

A rubber composition was prepared by mixing the formulation shown in Table 4 by a roll under shear force in the circumferential direction of the roll. The obtained rubber composition was vulcanized at 160 ° C. for 30 minutes to form a sheet having a thickness of about 2 mm. It was subjected to tests for tensile strength (Kg/cm$^2$; Tb), elongation at breaking (%; Eb), tear strength (Kg/cm; Tr) and hardness (JIS-A) according to JIS K6301 in the two directions (i.e. roll direction and a direction perpendicular to the roll direction). The results are also shown in Table 4. Ratios of physical properties between the two direction are also shown in Table 4.

TABLE 4

| Formulation | Examples | | | |
| --- | --- | --- | --- | --- |
|  | 2 | 3 | 4 | 5 |
| BR 11[1] | 100 | 100 | 100 | 100 |
| Nylon 66[2] = 7 denier-5 mm | 20 | — | — | — |
| = 14 denier-5 mm | — | 20 | 20 | 15 |
| Basic zinc methacrylate | 29.1 | 29.1 | 20.0 | 29.1 |
| Dicumyl peroxide | 1 | 1 | 1 | 1 |
| (Roll direction) | | | | |

TABLE 4-continued

| Formulation | Examples | | | |
|---|---|---|---|---|
| | 2 | 3 | 4 | 5 |
| Tb | 262 | 283 | 221 | 221 |
| Eb | 35 | 36 | 34 | 32 |
| Tr | 68 | 66 | 54 | 60 |
| (Perpendicular) | | | | |
| Tb | 83 | 66 | 41 | 64 |
| Eb | 48 | 40 | 36 | 42 |
| Tr | 33 | 26 | 18 | 19 |
| (Ratio) | | | | |
| Tb | 3.16 | 4.29 | 5.39 | 3.45 |
| Eb | 0.73 | 0.90 | 0.94 | 0.76 |
| Tr | 2.06 | 2.54 | 3.00 | 3.15 |
| Hardness | 91 | 92 | 90 | 91 |

[1] A butadiene rubber available from Nippon Synthetic Rubber Co., Ltd. (cis 1,4 content 96%).
[2] Nylon short fiber available from Teijin Ltd.

EXAMPLE 6

A rubber composition was prepared by mixing 70 parts by weight of butadiene rubber, 15 parts by weight of natural rubber, 15 parts by weight of EPDM, 65 parts by weight of basic zinc methacrylate, 10 parts by weight of calcium carbonate, 0.5 parts by weight of an antioxidant (available from Ohuchi Shinko Chemical company as Nocrack 300) and 1.0 part by weight of dicumyl peroxide using a roll under shear force to the circumferential direction of the roll. The resulting rubber composition was vulcanized at 160° C. for 30 minutes such that the rubber orientation direction was adjusted to a direction perpendicular to the walking direction, as shown in FIG. 1 to form rubber soles. Light mountain-climbing shoes were prepared using the rubber soles. The shoes were very easy to walk, because it has high bending ability to the walking direction but no slide to a direction perpendicular thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a rubber composition having anisotropy strength, comprising mixing said rubber composition under shearing force in a rubber orientation direction and vulcanizing said composition while in a mold, said rubber composition comprising a base rubber, 3 to 100 parts by weight of a metal salt of an alpha, beta-unsaturated fatty acid, and 0.5 to 5.0 parts by weight of an organic peroxide; said parts by weight being based on 100 parts by weight of said base rubber wherein crystals of said metal salt are oriented with a direction of rubber molecules in said rubber composition when mechanically mixed.

2. The process according to claim 1, wherein said base rubber is selected from the group consisting of butadiene rubber, styrene-butadiene rubber, EPDM, isoprene rubber, chloroprene rubber, natural rubber and mixtures thereof.

3. The process according to claim 2, wherein said base rubber is cis-1,4-polybutadiene rubber having a cis-structure of 90% or more.

4. The process according to claim 1, wherein said metal salt of said alpha, beta-unsaturated fatty acid is selected from at least one of a zinc, magnesium or calcium salt of at least one of an acrylic acid, methacrylic acid, itaconic acid or crotonic acid.

5. The process according to claim 1, wherein said metal salt of alpha, beta-unsaturated fatty acid is basic zinc methacrylate.

6. The process according to claim 1, wherein said organic peroxide is selected from the group consisting of perbenzoic acid, benzoyl peroxide, cumen peroxide, dicumyl peroxide and mixtures thereof.

7. The process according to claim 1, wherein said rubber composition further comprises a reinforcing agent and additives.

8. The process according to claim 7 wherein said reinforcing agent is short fiber having a length of 1 micrometer or more and a diameter of 5 μm or more.

9. The process according to claim 8 wherein said short fiber is present in said rubber composition in an amount of from 3 to 100 parts by weight, based on 100 parts by weight of said base rubber.

10. The process according to claim 1, wherein said mixing under shearing force is conducted by a roll, an extruder or an injection molder.

11. The process of claim 1, wherein said metal salt of alpha, beta-unsaturated fatty acid has 3 to 8 carbon atoms.

* * * * *